United States Patent Office 3,574,176
Patented Apr. 6, 1971

3,574,176
INTERPOLYMERIZATION OF A MIXTURE OF MONOOLEFINS AND A POLYENE IN THE PRESENCE OF CERTAIN BASES
Charles E. Boozer, Baton Rouge, La., assignor to Copolymer Rubber & Chemical Corporation
No Drawing. Continuation-in-part of application Ser. No. 571,168, Aug. 9, 1966, which is a continuation-in-part of application Ser. No. 551,513, May 20, 1966. This application Apr. 20, 1967, Ser. No. 632,168
Int. Cl. C08f *15/40*
U.S. Cl. 260—80.78                                            18 Claims

ABSTRACT OF THE DISCLOSURE

Sulfur vulcanizable elastomers having improved characteristics are prepared by interpolymerizing a monomeric mixture containing ethylene, at least one alpha-monoolefin containing 3–16 carbon atoms, and at least one polyene in a hydrocarbon polymerization solvent, and in the presence of a Ziegler catalyst and certain bases such as ammonia, aniline and pyridine. The elastomers are soluble in the hydrocarbon solvent, and are free of deleterious gel or crosslinking and other undesirable forms of polymerization. The properties of the elastomer are reproducible and a uniform product may be produced on a continuous basis. The catalyst mileage is also increased markedly when using certain preferred bases.

This application is a continuation-in-part of my copending application Ser. No. 571,168, filed Aug. 9, 1966, which in turn is a continuation-in-part of my copending application Ser. No. 551,513, filed May 20, 1966.

This invention relates to a novel process for preparing sulfur vulcanizable elastomers by interpolymerizing a monomeric mixture of alpha-monoolefins and at least one ethylenically unsaturated compound containing a plurality of carbon-to-carbon double bonds.

It is known that elastomers may be prepared by inter polymerizing a monomeric mixture composed of ethylene and at least one higher alpha-monoolefin having 3–16 carbon atoms in solution in an organic solvent and in the presence of a Ziegler catalyst. However, the resulting elastomers contain no ethylenic unsaturated and thus they are not sulfur vulcanizable. As a result, substances other than sulfur must be used as curing agents such as the organic peroxides.

Efforts have been made heretofore to provide ethylenic unsaturation in the above-mentioned class of elastomers by including a reactive monomeric polyene in the mixture of alpha-monoolefins to be polymerized. The resulting interpolymer contains residual ethylenic unsaturation, and it may be readily cured with sulfur following prior art practices to thereby provide vulcanized elastomeric products. However, when polymerizing monomeric mixtures including alpha-monoolefins and polyenes in accordance with prior art practices, often gel or insoluble polymer is formed, and the polymer has undesirable physical properties in general. Also, the internal surfaces of the reactor used in preparing the polymer are fouled with deposits which form thereon very rapidly and prevent long runs as the line must be shut down for cleaning. This is especially true when using certain polyene monomers which have highly reactive unsaturation as third monomers. As a result, the art has long sought an entirely satisfactory process whereby very reactive polyenes may be used as monomers to achieve residual unsaturation in the polymer without the attendant difficulties and disadvantages discussed above.

It is an object of the present invention to provide a novel process for preparing sulfur vulcanizable elastomers which are substantially free of gel or insoluble polymer from a monomeric mixture including ethylene, at least one alpha-monoolefin containing 3–16 carbon atoms, and at least one ethylenically unsaturated monomer containing a plurality of carbon-to-carbon double bonds.

It is a further object to provide a novel process for polymerizing a monomeric mixture containing ethylene propylene and a polyene whereby it is possible to control undesirable polymerization or crosslinking which results in gel or insoluble polymer.

It is still a further object to provide a novel continuous process for polymerizing the above monomeric mixtures whereby deposition of insoluble polymer on the internal surfaces of the reactor and related apparatus is substantially reduced or prevented.

Still other objects and advantages of the invention will be apparent to those skilled in the art upon reference to the following detailed discussion and the examples.

In accordance with the present invention, it has been discovered that sulfur vulcanizable elastomers having greatly improved characteristics may be prepared by interpolymerizing a monomeric mixture containing ethylene, at least one alpha-monoolefin containing 3–16 and preferably 3–10 carbon atoms, and at least one monomer containing a plurality of carbon-to-carbon double bonds in solution in a hydrocarbon polymerization solvent, and in the presence of a Ziegler catalyst and certain specific bases. The resulting elastomers are soluble in the hydrocarbon polymerization solvent, and are free of deleterious gel or crosslinking and other undesirable forms of polymerization. The properties of the elastomer are also reproducible within desired narrow limits and a uniform product may be produced on a continuous basis.

It has been further discovered that the process of the invention suppresses or even prevents entirely the deposition of insoluble polymer on the internal surfaces of the reaction vessel and equipment associated therewith. Thus, it is possible to operate the reactor and other equipment on a continuous basis for much longer periods of time than was possible prior to this invention before having to shut down for the purpose of removing the deposits of polymer. Surprisingly, the catalyst mileage, i.e., the weight of polymer that is produced per millimole of the heavy metal in the Ziegler catalyst is increased substantially with specific preferred bases.

A number of bases which are soluble in the polymerization solvent are known and may be used in practicing the invention. Examples include ammonia, aniline, pyridine, cyclohexylamine, hydrazine, quinoline, isoquinoline, alkyl, cycloalkyl and aryl substituted pyridines, anilines which have only one hydrogen atom attached to the nitrogen atom, hydrazines, hydroxylamines and O-ethers thereof, quinolines and isoquinolines, wherein the alkyl groups contain about 1–8 carbon atoms, the cycloalkyl groups contain about 4–12 carbon atoms and the aryl groups contain about 6–12 carbon atoms, and amines of the general formula

wherein R is hydrogen, and the two R' groups are selected individually from the group consisting of hydrogen, alkyl, halogenoalkyl, alkyl and aminoalkyl groups containing about 1–8 carbon atoms, cycloalkyl, aminocycloalkyl and halogenocycloalkyl groups containing about 4–12 carbon atoms, aryl, aminoaryl and halogenoaryl groups containing about 6–12 carbon atoms, and monovalent cyclic or bicyclic radicals containing 4–12 carbon atoms wherein the two R' groups are joined through a carbon, nitrogen or oxygen atom to form a heterocyclic ring, and not more than one R' is hydrogen. It is understood that the two R' groups need not be the same, as one R' may be an alkyl group, the second R' a cycloalkyl or aryl group, etc. Specific examples of primary and secondary amines including polyamines are given in the tables appearing on pages 616–628 and in other portions of the text "Elementary Practical Organic Chemistry, part II, Qualitative Organic Analysis," Arthur I. Vogel, Longmans, Green and Company, New York (1957), the teachings of which are incorporated herein by reference. Examples of polyamines include propylene diamine, diethylene triamine, etc. Examples of hydroxylamines include hydroxyl amine and monomethyl, dimethyl, monoethyl, and diethyl hydroxylamines. The O-ethers of the above hydroxylamines may be used, wherein the alcoholic residue of the ether group is a monovalent hydrocarbon radical such as an alkyl group containing 1–5 carbon atoms.

Nuclearly substituted anilines and pyridines may be employed, and the ring substituents may be alkyl groups containing 1–8 and preferably 1–4 carbon atoms. Nuclearly halogen-substituted anilines and pyridines also may be employed. Specific examples of such anilines and pyridines include the isomeric toluidines, the ring halogenated anilines and pyridines, picollines, ludidines, collidine, and N-monoalkyl anilines wherein the alkyl group contains 1–5 carbon atoms.

Of the foregoing bases, ammonia, aniline and pyridine are much preferred. Ammonia and aniline are unique and produce outstanding results as they also act as promoters and increase the amount of polymer produced per unit weight of catalyst.

The amount of the base to be employed may vary over wide ranges. It is only necessary that the base be added to the hydrocarbon polymerization solvent in an amount to control gel formation and other undesirable polymerization, and amounts in excess of this are not needed and should be avoided for better results. In most instances, the base should be dissolved in the hydrocarbon polymerization solvent in an amount of about 0.1–10 millimoles per liter, and preferably in an amount of about 0.1–4 millimoles per liter. Better results are usually obtained when the polymerization solvent contains about 0.5–2 millimoles of dissolved base per liter. When based on the heavy catalyst metal content of the Ziegler catalyst the amine may be present in an amount of 1–30 moles and preferably 2–15 moles per mole of the catalyst metal.

The general conditions usually employed in the prior art for the interpolymerization of the reactants to produce sulfur vulcanizable elastomers may be used, with the exception of carrying out the interpolymerization in a hydrocarbon solvent and in the presence of the base. The specific monomers and ratios of monomers to be polymerized need not differ from those used in the prior art for preparing elastomers. In many instances, it is preferred that the elastomers be prepared from a monomeric mixture containing ethylene, propylene and a polyene. Halogen substituted polyenes and especially chlorine substituted polyenes, or substituted polyenes containing other types of substituents which do not adversely affect the polymerization, may be present in the monomeric mixture to be polymerized. Thus, one or more suitable substituted or unsubstituted monomers in general which contain a plurality of carbon-to-carbon double bonds may be interpolymerized with a mixture of alpha monoolefins to produce elastomers. Examples of halogenated polyunsaturated monomers are disclosed in U.S. Pats. No. 3,220,988 and 3,222,330.

The elastomer may contain chemically bound therein molar ratios of ethylene to propylene varying between 90:10 and 10:90 and preferably between 70:30 and 55:45. The polyene or substituted polyene may be chemically bound therein in an amount to provide an actual unsaturation level of not less than about 2 double bonds per 1000 carbon atoms in the polymer chain; however, much higher actual unsaturation levels are possible such as for example, 5, 10, 20, 25, 30, 50 or 100 double bonds per 1000 carbon atoms in the polymer. The specific unsaturation level selected in a given instance will vary depending upon the properties which are desired in the elastomer, as is well recognized in the art. The invention is especially useful when preparing polymers containing 7–30, and preferably 10–25, double bonds per 1000 carbon atoms.

In instances where it is desired to prepare a tetrapolymer, or a polymer containing five or more different monomers, then one or more alpha-monoolefins containing 4–16 and preferably 4–10 carbon atoms should be substituted for an equal molar quantity of bound propylene in the above-mentioned polymer composition. For instance, the preferred range of the fourth monomer in tetrapolymers will usually be about 5–20 mole percent, but smaller amounts may be present such as 1,2,3 or 4 mole percent.

The polymerization solvent may be any suitable hydrocarbon solvent which is liquid and inert under the reaction conditions, and it may be a prior art hydrocarbon solvent for solution polymerization of monoolefins in the presence of Ziegler-type catalysts. Examples of satisfactory hydrocarbon solvents include paraffins containing 5–8 carbon atoms and especially straight chain paraffins of which hexane often gives the best results; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring. The solvent that is selected may be a mixture of two or more of the foregoing hydrocarbons including mixtures of aliphatic and naphthenic hydrocarbon isomers having approximately the same boiling range as normal hexane. It is necessary that the solvent be dry and free of substances which will interfere with the Ziegler catalyst to be used in the polymerization step.

Ziegler catalysts in accordance with the prior art may be used. In general, any suitable prior art Ziegler-type catalyst may be used which is known to produce a satisfactory elastomer. Ziegler catalysts are disclosed in a large number of issued patents, such as U.S. Pats. No. 2,933,480, 3,093,620; 3,093,621; 3,113,115 and 3,211,709. Examples of Ziegler catalysts include metal organic coordination catalysts prepared by contacting a compound of a metal of Groups IVa, Va, VIa and VIIa of the Mendelejeff periodic chart of the elements, as typified by titanium, vanadium and chromium halides, with an organometallic compound of a metal of Groups I, II or III of the Mendeljeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, proply, butyl or isobutyl radical. A catalyst prepared from methyl or ethyl aluminum sesquichloride and vanadium oxychoride is especially preferred, and when using this catalyst, the optimum ratio of the catalyst components is usually 1 mole of vanadium oxychloride for each 4–10 moles of the alkyl aluminum sesquichloride to thereby provide a ratio of aluminum to vanadium of 8:1 to 20:1.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers, catalyst and the selected bases of the invention, and conduit means for continuously withdrawing the solution of elastomer. The polymerization is carried out in liquid phase in the hydrocarbon solvent in the presence of the Ziegler catalyst and the specific bases described herein. The solution of elastomer in the polymerization solvent is withdrawn continuously from the reaction vessel, the catalyst is killed by addition of a catalyst deactivator such as methanol or water, and the hydrocarbon solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for baling in accordance with prior art practice.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms such as 1,4-hexadiene, monocyclic polyenes, and polycyclic polyenes. The polyunsaturated bridged-ring hydrocarbons or halogenated bridged-ring hydrocarbons are usually preferred. Examples of the bridged-ring hydrocarbons include the polyunsaturated derivatives of bicyclo(2,2,1)heptane wherein at least one double bond is present in one of the bridged rings, such as dicyclopentadiene, byicyclo(2,2,1)hepta-2,5-diene, the alkylidene norbornenes, and especially the 5-alkylidene-2-norbornenes, wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo(2,2,2)octane as represented by bicyclo(2,2,2)-octa-2,5-diene, polyunsaturated derivatives of bicyclo-(3,2,1)octane, polyunsaturated derivatives of bicyclo-(3,31)nonane, and polyunsaturated derivatives of bicyclo(3,2,2)nonane. At least one double bond is present in a bridged ring of the above compounds, and at least one other double bond is present in a bridged ring or in a side chain. Further examples of polyunsaturated bridged-ring hydrocarbons and their use in the preparation of prior art elastomers are found in U.S. Pats. No. 2,933,-480; 3,093,620; 3,093,621 and 3,211,709, the disclosures of which are incorporated herein by reference.

The elastomers which are especially preferred contain chemically bound therein molar ratios of ethylene to propylene varying between 70:30 and 55:45. Specific examples of preferred bridged ring compounds include 5-methylene - 2 - norbornene, 5-ethylidene-2-norbornene, 5 - n - propylidene - 2 - norbornene, 5-isopropylidene-2-norbornene, 5 - n - butylidene - 2-norbornene, 5-isobutylidene - 2 - norbornene, dicyclopentadiene, the methyl butenyl norbornenes such as 5 -(2 - methyl - 2 - butenyl)- 2 - norbornene or 5 - (3 - methyl - 2-butenyl)-norbornene, and 5 - (3,5 - dimethyl - 4 - hexenyl) - 2 - norbornene. The elastomer prepared from 5-ethylidene-2-norbornene is much preferred as it has outstanding properties and produces many unusual and unexpected results. As a result, this elastomer is in a class by itself.

The process of the present invention is especially useful in the preparation of sulfur-curable elastomers from monomeric mixtures including certain polyunsaturated monomers which tend to cause the formation of gel and insoluble polymer, and the fouling of the internal surfaces of the reactor and associated equipment. Examples of such monomers include the bridged-ring polyenes mentioned above, and especially the alkylidene norbornenes. Diolefins such as 5-methylene-2-norbornene, 5-ethylidene-2-norbornene, dicyclopentadiene, and polyenes in general which have strained or highly active unsaturation, have a very marked tendency to cause gel and undesirable polymerization. Thus the invention is most useful when one of these monomers is present as the polyene.

For some reason which is not fully understood at the present time, elastomers prepared from monomeric mixtures containing ethylene, at least one higher straight chain alpha monoolefin having 3–16 and preferably 3–10 carbon atoms such as propylene, and certain polyenes such as 5-ethylidene-2-norbornene, have a much more rapid cure rate when cured with sulfur than would be predicted from the actual carbon-to-carbon double bond content. In such instances, the apparently higher unsaturation level is embraced within the term "effective" unsaturation level of the elastomer. The elastomers may be analyzed to determine the effective unsaturation level by the consumption of bromine, correcting for the substitution reaction by a kinetic method based on the spectrophotometric method developed by Siggia, et al., Anal. Chem. 35, 362 (1963). The effective carbon-to-carbon double bond content per 1000 carbon atoms in the elastomer, which may or may not be equal to the actual carbon-to-carbon double bond content is calculated from the resulting data to determine the effective unsaturation level. When 5 - ethylidene - 2 - norbornene is the third monomer, the effective unsaturation level is about 1.5 times as great as the actual or calculated unsaturation level. The effective unsaturation level may be, for example, 2–100 and preferably about 2–60 carbon-to-carbon double bonds per 1000 carbon atoms in the elastomer. Elastomers having effective unsaturation levels of less than 7, and preferably about 2–5, carbon-to-carbon double bonds per 1000 carbon atoms are often preferred for tire tread stocks and mechanical goods in general. Elastomers having effective unsaturation levels of 7–30, and for better results 10–20, carbon-to-carbon double bonds per 1000 carbon atoms usually are preferred for blending with highly unsaturated rubbers such as diene rubbers.

The base is preferably added to the polymerization mixture on a continuous basis. For instance, ammonia, aniline and/or pyridine may be dissolved in a portion or all of the polymerization solvent, and/or the third monomer, and added to the reactor continuously.

The foregoing detailed description and the following specific examples are for purposes of illustration only, and are not intended as being limiting to the spirit or scope of the appended claims.

EXAMPLE I

This example illustrates the preparation of a terpolymer from a monomeric mixture composed of ethylene, propylene and 5-methylene-2-norbornene, in the presence of pyridine.

The reaction vessel was a one-half gallon Sutherland reactor equipped with a high speed, heavy-duty, air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement, which was produced on a continuous basis. A vapor phase vent was provided to bleed off 15% of the gaseous monomer feed to prevent inert gas buildup.

The clean reactor was assembled, rinsed with dry hexane and purged overnight with dry nitrogen. The reactor bowl was heated the next morning with a flameless blowtorch, and hot water was run through the coils until the temperature in the reactor was about 70° C. After this, propylene was flushed through the reactor for about 15 minutes. The temperature was lowered to ambient and one liter of Esso chemical grade hexane, which had been dried over 4A molecular sieve and stored over sodium, was added to the reactor. As the temperature was raised to 40° C., propylene was fed to the reactor through a 4A molecular sieve column until a pressure of 43.1 inches of mercury was reached. The pressure was raised to 61.0 inches of mercury with ethylene fed thorugh a 4A molecular sieve column and 2.41 millimoles (0.29 cc.) of 5-methylene-2-norbornene and 1.3 cc. of 1.5 molar ethylaluminum sesquichloride were added.

After addition of the above monomers, the catalyyst components, i.e., 0.525 molar ethylaluminum sesquichloride and 0.0543 molar vanadium oxytrichloride at a 12 to 1 aluminum to vanadium ratio, were fed into the reactor at a constant rate until a drop in the pressure in the reactor was noted. At this time, more of the gaseous monomers wer fed into the reactor through calibrated rotometers at a rate of 1559 cc./minute, of which 700 cc. were ethylene and 859 cc. were propylene. The 5-methylene-2-norbornene was added as a 0.063 molar solution in hexane, which was also 0.004 molar in pyridine, at a rate of 4.25 cc./minute which provided about 2 weight percent to be incorporated into the polymer. The polymerization was controlled by the catalyst pumps which added catalyst on demand as the pressure increased, thus maintaining the 61 inches of mercury pressuer throughout the run. When the solvent in the reactor contained approximately 5% polymer, fresh solvent containing 16 cc. of ethylene per cc. of solvent was fed into the reactor at the rate of 30.2 cc./minute, and the polymer cement was taken off continuously. About 84.3 g. of polymer per hour was produced.

At this time, the ethylene and propylene feeds were adjusted to 286 cc./minute and 1778 cc./minute, respectively, to compensate for the unreacted monomers removed with the cement. The feed rate for the solution of 5-methylene-2 norbornene was adjusted to 5.70 cc./minute.

The solution of cement as removed from the reactor was fed into a Waring Blendor containing water where it was intimately mixed therewith. The cement was then washed three times with equal volumes of water. About 1% by weight of a stabilizer (SDAO, a product of Naugatuck Chemical Company) was added to the washed cement and it was fed under nitrogen pressuer into a T-joint at the bottom of a 4-liter container filled with hot circulating water. The other end of the "T" was connected to a steam line and steam was admitted at a rate to superheat the cement. The solvent and unreacted monomers were mostly removed by this procedure. The polymer crumb was collected on a screen, washed, chopped up in a Waring Blendor, and dried in an oven at 90° C. to remove any remaining solvent and water. The rubbery polymer had a mole ratio of chemically bound ethylene to propylene of 60:40 as determined by infrared analysis, using the 720 cm.$^{-1}$ absorbance for ethylene and the 968 cm.$^{-1}$ absorbance for propylene. The polymer had a reduced specific viscosity (0.1% in Decalin at 135° C.) of 3.12 and the calculated or theoretical unsaturation expressed in C=C/1000 carbon atoms was 2.7. A 0.1% solution of the polymer in Decalin, e.g., 0.1 g. of the polymer dissolved in 100 cc. of Decalin, was used in this and the following examples when measuring the reduced specific viscosity.

Curing of the dried rubbery polymer was effected by compounding in a Brabender Plasti-Corder, on a weight basis, 10 parts of rubber, 80 parts of semi-reinforcing carbon black, 55 parts of naphthenic rubber processing oil, 5 parts of zinc oxide, 1 part of stearic acid, 0.75 part of mercaptobenzothiazole, 1.5 parts of tetramethylthiuram sulfide, and 1.5 parts sulfur. Curing was for 30 minutes at 150° C. The properties of the cured polymer were determined by standard ASTM methods D–412–62–T, D–1646–63 and D–395–61–B.

The hardness was determined on a Shore A Durometer. The belt life is the time in hours necessary for a 0.032" cut in a belt to grow to 5 times its original length when it is run on small pulleys in a chamber at 71° C. Heat rise ($\Delta T$, ° F.) was by the Goodrich method. Dispersion was a visual rating of the compounded stock. The slope of the cure curve was determined on a Monsanto Rheometer.

| | |
|---|---|
| $ML_4$ (raw) | 158 |
| $ML_4$ compounded | 104 |
| Percent elongation | 500 |
| 300% modulus | 1725 |
| Tensile | 3425 |
| $\Delta T$, ° F. | 95 |
| Hardness | 60 |
| Dispersion | Very good. |
| Belt life (hours) | 16.0 |
| Cure rate | 3.4 |

EXAMPLE II

This example illustrates the preparation of a terpolymer having a calculated unsaturation level of 2.7 carbon-to-carbon double bonds per 1000 carbon atoms in the presence of pyridine.

The procedure of Example I was repeated with the exception of using a hexane solution of the 5-methylene-2-norbornene which was 0.0079 molar in pyridine.

The polymer was tested in accordance with Example I. The polymer contained no gel, and had a reduced specific viscosity (0.1% in Decalin at 135° C.) of 2.46 and a raw Mooney value of 88 $ML_4$. Thus, the molecular weight of the polymer was decreased markedly by increasing the pyridine level.

EXAMPLE III

This example illustrates the preparation of a terpolymer containing a calculated unsaturation level of 7.0 carbon-to-carbon double bonds per 1000 carbon atoms in the presence of pyridine.

The general procedure of Example I was followed with the exception of using a polymerization temperature of 30° C., a feed rate of the solution of 5-methylene-2-norbornene providing 5.3 weight percent for incorporation into the polymer, and a pyridine level 2.5 times that of Example I.

The resulting polymer contained no gel and had a reduced specific viscosity (0.1% in Decalin at 135° C.) of 3.92.

EXAMPLE IV

This example illustrates the preparation of a terpolymer having a calculated unsaturation level of 7.0 carbon-to-carbon double bonds per 1000 carbon atoms in the presence of pyridine.

The procedure of Example III was repeated, with the exception of using an increased concentration of pyridine in the hexane solution of 5-methylene-2-norbornene. About 4 times as much pyridine was used in this example as in Example I.

The resulting polymer contained no gel and the reduced specific viscosity (0.1% in Decalin at 135° C.) was 3.25. A uniform solution viscosity was maintained in the reactor throughout the polymerization, and there was no buildup of insoluble polymer on the surfaces of the reactor.

EXAMPLE V

This example illustrates the preparation of a terpolymer having a calculated unsaturation level of 2.7 carbon-to-carbon double bonds per 1000 carbon atoms in the absence of an amine.

The general procedure of Example I was followed with the exception of omitting the pyridine from the hexane solution of 5-methylene-2-norbornene. Once continuous operation was started, it was impossible to maintain a uniform solution viscosity in the reactor, or prevent the rapid buildup of insoluble polymer on the internal surfaces of the reactor.

The polymerization had to be terminated after a few minutes of continuous operation as it was impossible to continue due to the formation of gel and insoluble polymer in the reactor.

The resulting polymer had an extremely high gel content, and the reduced specific viscosity (0.1% in Decalin at 135° C.) and Mooney value ($ML_4$) were also extremely high. The polymer could not be processed by the usual procedures.

EXAMPLE VI

This example illustrates the preparation of a terpolymer from a monomeric mixture of ethylene, propylene and 5-ethylidene-2-norbornene in the presence of pyridine.

The general procedure of Example I was followed with the exception of substituting 5-ethylidene-2-norbornene for the 5-methylene-2-norbornene. Also, the catalyst was prepared from a 0.351 molar solution of ethylaluminum sesquichloride and a 0.0363 molar solution of vanadium oxytrichloride using a 12:1 aluminum to vanadium ratio. The gaseous monomers were fed to the reactor at a rate of 1422 cc./minute, of which 683 cc. were ethylene and 739 cc. were propylene. The 5-ethylidene-2-norbornene was added as a 0.17 molar solution in hexane, which was also 0.010 molar in pyridine, at a rate of 1.70 cc./minute to thereby provide approximately 2.5 weight percent to be incorporated into the polymer. When the solution in the reactor contained approximately 6% polymer, fresh solvent containing 16 cc. of ethylene per cc. of solvent was fed into the reactor at a rate of 27.7 cc./minute and the polymer cement was taken off continuously. The polymer was produced at a rate of about 84.7 grams per hour. At this time, the ethylene and propylene feeds were adjusted to 303 cc./minute and 1568 cc./minute to compensate for the unreacted monomers removed with the cement. The feed rate for the solution of 5-ethylidene-2-norbornene was adjusted to 2.17 cc./minute.

The resulting polymer had a mole ratio of chemically bound ethylene to propylene of 59:41 and about 2.5 weight percent of bound 5-ethylidene-2-norbornene. The calculated unsaturation level was 2.9 carbon-to-carbon double bonds per 1000 carbon atoms. The polymer contained no gel and it had a reduced specific viscosity (0.1% in Decalin at 135° C.) of 2.33. The raw Mooney value was 74 ($ML_4$). Upon compounding and curing in accordance with Example I, the elongation was 510%, the 300% modulus was 1600, the tensile strength was 2925, the hardness 64, and the Goodrich $\Delta T$ was 85.

It was possible to carry out the polymerization on a continuous basis and maintain a uniform solution viscosity in the reactor. There was no buildup of insoluble polymer on the reactor surfaces and the polymerization proceeded very satisfactory.

EXAMPLE VII

The general procedure of Example VI was repeated, with the exception of carrying out the polymerization in the absence of pyridine and reducing the feed of 5-ethylidene-2-norbornene to provide 2.3 weight percent to be incorporated into the polymer. The final polymer had a mole ratio of chemically bound ethylene to propylene of 62:38 as determined by infrared analysis, and an unsaturation level of 2.7 carbon-to-carbon double bonds per 1000 carbon atoms.

The resulting polymer contained no gel. The reduced specific viscosity (0.1% in Decalin at 135° C.) was 3.04 and the raw Mooney value was 108 ($ML_4$). It was much more difficult to maintain optimum polymerization conditions in the reactor in this example than in Example VI.

EXAMPLE VIII

Normally, the tendency toward formation of gel and insoluble polymer increases with the third monomer content. This example illustrates the preparation of a terpolymer having a third monomer content of about 22 weight percent, which is very high, in the presence of pyridine.

The general procedure of Example VI was followed with the exception of using a catalyst prepared from a 1.06 molar solution of ethylaluminum sesquichloride and a 0.105 molar solution of vanadium oxytrichloride using a 12:1 aluminum to vanadium ratio. The polymerization temperature was 25° C. and the gaseous monomers were fed to the reactor at a rate of 1698 cc./minute, of which 709 cc. were ethylene and 989 cc. were propylene. The 5-ethylidene-2-norbornene was added as a 0.5 molar solution in hexane, which also was 0.023 molar in pyridine, at a rate of 6.31 cc./minute, to provide 22% by weight to be incorporated in the polymer. The pressure was maintained at 61 inches of mercury throughout the polymerization. When the solution in the reactor contained about 6 weight percent of polymer, fresh solvent containing 16 cc. of ethylene per cc. of solvent was fed into the reactor at the rate of 28.2 cc./minute, and the polymer cement was taken off at a continuous rate. About 105 grams of polymer was produced per hour. At this time, the ethylene and propylene feeds were adjusted to 343 cc./minute and 2193 cc./minute, respectively, to compensate for the unreacted monomers removed with the cement. The feed rate of the 5-ethylidene-2-norbornene solution was increased to 8.13 cc./minute.

The resulting polymer had a mole ratio of chemically bound ethylene to propylene of 63:37 as determined by infrared analysis, and a calculated unsaturation level of 25 carbon-to-carbon double bonds per 100 carbon atoms. The polymer contained no gel, and had a reduced specific viscosity (0.1% in Decalin at 135° C.) of 1.24.

A uniform solution viscosity was easily maintained in the reactor throughout the polymerization and there was no evidence of rapid buildup of insoluble polymer on the surfaces of the reactor, nor of other undesirable polymerization. This is remarkable in view of the high level of third monomer which was used.

EXAMPLE IX

The general procedure of Example I was followed except as noted hereinafter.

The polymerization temperature was 25° C. The third monomer was 5-(2-methyl-2-butenyl) - 2 - norbornene, which was added to the reactor initially in an amount of 34.6 millimoles, in the presence of 20 microliters of pyridine. The catalyst was prepared from a 1.06 molar solution of ethylaluminum sesquichloride and a 0.105 molar solution of vanadium oxytrichloride using a 12:1 aluminum to vanadium ratio. The gaseous monomers were fed to the reactor at a rate of 1726 cc./minute, of which 711 cc. were ethylene and 1015 cc. were propylene. The 5-(2-methyl-2-butenyl)-2-norbornene was added as a 0.5 molar solution in hexane, which was also 0.01 molar in pyridine, at a rate of 6.89 cc./minute to provide 29 weight percent to be incorporated into the polymer. A pressure of 61 inches of mercury was maintained throughout the polymerization. When the solution in the reactor contained 7 weight percent of polymer, fresh solvent containing 16 cc. of ethylene per cc. of solvent was fed into the reactor at the rate of 27 cc./minute, and the polymer cement was taken off continuously. The polymer was produced at the rate of 126 grams per hour. At this time, the ethylene and propylene feeds were adjusted to 363 cc./minute, and 2205 cc./minute, respectively, to compensate for the unreacted monomers removed with the cement. The feed rate of the 5-(2-methyl-2-butenyl)-2-noboronene solution was increased to 9.36 cc./minute.

The polymer had a mole ratio of chemically bound ethylene to propylene of 66:34 as determined by infrared analysis, and a calculated unsaturation level of 27 carbon-to-carbon double bonds per 1000 carbon atoms. The polymer contained no gel, and had a reduced specific viscosity (0.1% in Decalin at 135° C.) of 1.12. It was possible to control the molecular weight very effectively in the presence of the pyridine even at the high level of third monomer.

EXAMPLE X

The general procedure of Example 1 was followed except that the pyridine level was doubled, dicyclopentadiene was substituted as the third monomer, and the catalyst was prepared from methylaluminum sesquichloride.

The polymer had a mole ratio of chemically bound ethylene to propylene of 61:39 and contained a calculated unsaturation level of 4 carbon-to-carbon double bonds per 1000 carbon atoms. The reduced specific viscosity (0.1% in Decalin at 135° C.) was 2.19, and the raw Mooney value was 83 (ML$_4$). It was possible to carry out the polymerization continuously while maintaining a uniform solution viscosity in the reactor, and insoluble polymer buildup on the surfaces of the reactor was not a problem. Also, there was no tendency toward undue crosslinking and gelling or other undesirable polymerization.

EXAMPLE XI

The procedure of Example X was repeated with the exception of omitting the pyridine and using a catalyst prepared from ethylaluminum sesquichloride rather than methylaluminum sesquichloride.

The polymer had a mole ratio of chemically bound ethylene to propylene of 64:36 by infrared analysis, and a calculated unsaturation level of 4 carbon-to-carbon double bonds per 1000 carbon atoms. The reduced specific viscosity (0.1% in Decalin at 135° C.) was 2.72, and the raw Mooney value was 160 (ML$_4$). The molecular weight of the polymer produced in the absence of pyridine was much higher than that produced in the presence of pyridine. Also, it was much more difficult to maintain a uniform solution viscosity in the reactor and the tendency toward crosslinking and gelling was much more pronounced.

EXAMPLE XII

This example illustrates the use of di-n-butylamine with Ziegler catalyst systems.

A seven-ounce laboratory polymerization bottle was flushed with nitrogen, capped and weighed. Dry hexane (100 cc.) was injected by syringe into the bottle, and the bottle was saturated with a gas mixture containing 27 mole percent of ethylene and 73 mole percent of propylene. The polymerization was carried out with a shaker type of agitation at room temperature. The necessary equipment was provided to constantly supply a gas mixture of 67% ethylene and 33% propylene to the bottle at a controlled 100 p.s.i.g. pressure to maintain the proper feed of monomer during the course of the polymerization.

The polymerization was started by adding the following materials to the bottle in the order given:

0.33 cc. of a 0.755 molar hexane solution of 5-methylene-2-norbornene,
0.83 cc. of a 0.05 molar hexane solution of di-n-butylamine,
0.83 cc. of a 0.025 molar hexane solution of vanadium oxytrichloride, and
0.83 cc. of a 0.3 molar hexane solution of ethylaluminum sesquichloride solution.

The bottles were also given a similar charge 450 seconds later as the polymerization proceeded.

A control bottle was also prepared with di-n-butylamine being omitted from the charge. Otherwise, the above procedure was followed.

The polymerization was allowed to continue for 900 seconds after the first additions were completed in the bottle containing the di-n-butylamine. The polymerization was terminated at the end of 900 seconds by injection of 0.5 cc. of methanol and unreacted gases were vented from the bottle and the terpolymer was recovered. The terpolymer was free of gel.

The control polymerization was terminated at 300 seconds due to the complete gelation.

Hexamethylenetetramine could also be used under the above conditions.

EXAMPLE XIII

This example illustrates the preparation of a terpolymer from a monomeric mixture composed of ethylene, propylene and 5-methylene-2-norbornene in the presence of pyridine as a gelation suppressor.

Seven ounce laboratory polymerization bottles were flushed with dry nitrogen, 100 cc. of dry chemical grade hexane was added, and the bottles were capped with self-sealing perforated crown caps. The hexane in each bottle was then saturated with a mixture of monomer gases consisting of 27 mole percent of ethylene and 73 mole percent of propylene.

The polymerization was carried out with shaker type agitation at room temperature. The necessary equipment was provided to constantly supply a gas mixture containing 67 percent ethylene and 33 percent propylene at a controlled 10 p.s.i.g. pressure to maintain the proper feed of monomers during the course of the polymerization.

The polymerization was started by adding the following in the order given to each of the two bottles:

(1) 0.8 cc. of 5-methylene-2-norbornene as a 0.5 molar solution in chemical grade dry hexane,
(2) 0.83 cc. of a 0.05 molar hexane solution of pyridine,
(3) 0.8 cc. of ethyl aluminum sesquichloride as a 0.3 molar solution in hexane, and
(4) 0.8 cc. of vanadium oxytrichloride as a 0.025 molar solution in dry chemical grade hexane.

The bottles were given a similar charge 450 seconds later.

A control bottle was also prepared with the pyridine omitted from the charge. Otherwise, the above procedure was followed.

The polymerizations were allowed to continue for 900 seconds after the first additions were completed in all bottles except the control in which no pyridine was present. The control polymerization was terminated at 300 seconds due to gel formation as evidenced by pieces of insoluble polymer precipitating out of solution.

The polymerization of the pyridine-containing mixture was terminated at the end of 900 seconds by injection of 0.5 cc. of methanol and the makeup gas flow was shut off. The polymer was recovered by placing 150 cc. of methanol in a Waring Blendor and adding the polymer solution with stirring. The polymer was collected and dried overnight in a 50° C. vacuum oven.

The terpolymer prepared in both bottles containing pyridine was free of gel. The terpolymer prepared in the control bottle without pyridine had 36% gel as determined by weighing the residue or gel material which was insoluble in hot Decalin.

The reduced specific viscosity (0.1% polymer dissolved in Decalin at 135° C.) was 3.2 and 3.8 for the bottles with pyridine and 4.8 for the terpolymer from the control bottle without pyridine added to the charge.

The catalyst mileage was 37 grams of polymer per millimole of vanadium in the bottle without pyridine, and 38 and 39 grams of polymer per millimole of vanadium in the two bottles with pyridine.

EXAMPLE XIV

This example illustrates the preparation of a terpolymer in the presence of aniline as a gelation suppressor.

The procedure of Example XIII was repeated with the exception of adding 0.83 cc. of 0.5 molar aniline in hexane instead of pyridine to the charge. The polymerization proceeded satisfactorily without gelation to the end of the 900 second period. The recovered polymer was free of gel and had a reduced solution viscosity of 4.1. The catalyst mileage was 46 grams of polymer permillimole of vanadium, as compared with 38–39 grams for pyridine in Example XIII. Thus, surprisingly aniline also has the ability to increase the catalyst mileage very markedly.

EXAMPLE XV

The general procedure of Example XIII was followed except as noted hereinafter.

The third monomer was 5-ethylidene-2-norbornene, and aniline was used as a gelation suppressor. Two control bottles were also prepared with the aniline omitted from the charge. The polymerizations were conducted with shaker type agitation in a 35° C. temperature water bath.

The bottles were given the second charge of third monomer, catalyst, and aniline at the end of the 560 seconds and were allowed to react 1200 seconds when 1 cc. of isopropanol was injected to stop further polymerization.

The terpolymer produced in the two bottles with aniline weighed 2.35 and 2.32 grams, giving a catalyst consumption (grams of polymer per millimole of vanadium) of 39 and 37, respectively. The reduced solution viscosity of the polymer was 3.4 and 3.3, respectively.

The polymer produced in the control bottles without aniline weighed 1.90 and 1.93 grams, respectively, giving a catalyst consumption of 32 grams/millimole of vanadium for both bottles. The reduced solution viscosity was 3.7 and 4.0, respectively.

EXAMPLE XVI

This example illustrates the preparation of a terpolymer in the presence of ammonia as a gelation suppressor.

The procedure of Example XIII is repeated with the exception of adding 0.83 cc. of a 0.5 molar solution of anhydrous ammonia in benzene to the two bottles instead of the hexane solution of pyridine. The polymerization proceeds satisfactorily to the end of the 900 second period, and the reaction is terminated. The recovered polymer is free of gel and has a reduced solution viscosity of 4. The catalyst mileage is 45–50 grams of polymer per millimol of vanadium. Thus, ammonia also has the ability to increase the catalyst mileage very substantially.

The various primary and secondary amines disclosed herein may be substituted for pyridine in Examples I–XI in equivalent molar quantities to obtain comparable results.

What is claimed is:

1. In a process for preparing a sulfur vulcanizable elastomer wherein a monomeric mixture containing ethylene, at least one alpha-monoolefin containing about 3–16 carbon atoms in the ratio of 90:10 to 10:90 of ethylene to monoolefin and at least one ethylenically unsaturated monomer having a plurality of non-conjugated carbon-to-carbon double bonds in amount to provide at least two carbon-to-carbon double bonds per 1000 carbon atoms of the elastomer is interpolymerized in solution in an organic solvent in the presence of a Ziegler polymerization catalyst formed of a vanadium compound and an alkyl aluminum halide to produce a solution of the sulfur vulcanizable elastomer and thereafter the elastomer is recovered from the organic solvent solution, the polymerization of the monomer mixture in the presence of the Ziegler catalyst normally tending to produce a crosslinked elastomer, the improvement which comprises polymerizing the monomeric mixture in a hydrocarbon solvent in the presence in the hydrocarbon solvent of a base in an amount greater than 1 mole per mole of vanadium in the catalyst to suppress undesirable crosslinking of the elastomer, the base being selected from the group consisting of ammonia, pyridine, hydrazine, hydroxylamine and O-ethers thereof wherein the ether group contains 1–5 carbon atoms, quinoline, isoquinoline, poly, primary and secondary amines, alkyl, cycloalkyl, and aryl substituted pyridines, hydrazines, hydroxylamines and O-ethers thereof, quinolines and isoquinolines wherein the alkyl groups contain about 1–8 carbon atoms,, the cycloalkyl groups contain about 4–12 carbon atoms and the aryl groups contain about 6–12 carbon atoms, and amines of the general formula

wherein R is a hydrogen and the two R' are groups selected individually from the group consisting of hydrogen, alkyl, halogenoalkyl, and aminoalkyl groups containing about 1–8 carbon atoms, cycloalkyl, halogenocycloalkyl, and aminocycloalkyl groups containing about 4–12 carbon atoms, aryl, halogenoaryl and aminoaryl groups containing about 6–12 carbon atoms, and monovalent cyclic and bicyclic radicals containing 4–12 carbon atoms wherein the two R' groups are joined through an atom selected from the group consisting of carbon, nitrogen and oxygen to form a heterocyclic ring, and not more than one R' is hydrogen.

2. The process of claim 1 wherein the base is selected from the group consisting of ammonia, aniline, pyridine, and mixtures thereof.

3. The process of claim 1 wherein the base is ammonia.

4. The process of claim 1 wherein the base is aniline.

5. The process of claim 1 wherein the base is dissolved in the hydrocarbon solvent in an amount of about 0.1–10 millimoles per liter.

6. The process of claim 1 wherein the polymerization is carreid out continuously in a reaction vessel, the resulting elastomer normally deposits on the internal surface of the reactor when the monomeric mixture is polymerized in the absence of the base, the base is selected from the group consisting of ammonia, aniline and pyridine, and the base is dissolved in the hydrocarbon solvent in an amount of about 0.1–4 millimoles per liter to thereby suppress the deposition of the elastomer on the reactor surface.

7. The process of claim 1 wherein the monomeric mixture contains ethylene, propylene and a polyunsaturated bridged-ring hydrocarbon containing at least one ethylenic double bond in one of the bridged rings, and the elastomer has a mole ratio of chemically bound ethylene to propylene between 80:20 and 20:80 and has an effective unsaturation level of at least 2 carbon-to-carbon double bonds per 1000 carbon atoms.

8. The process of claim 7 wherein the base is selected from the group consisting of ammonia, aniline and pyridine, and the base is present in the organic solvent in an amount of about 0.1–10 millimoles per liter.

9. The process of claim 8 wherein the elastomer has an unsaturation level of about 2–25 carbon-to-carbon double bonds per 1000 carbon atoms and the bridged-ring hydrocarbon is an alkylidene norbornene and the alkylidene group contains about 1–8 carbon atoms.

10. The process of claim 7 wherein the bridged-ring hydrocarbon is selected from the group consisting of dicyclopentadiene, 5-methylene-2-norbornene, 5-ethylidene-2-norbornene, and 5-isopropylidene-2-norbornene.

11. The process of claim 10 wherein the base is selected from the group consisting of ammonia, aniline and pyridine.

12. The process of claim 11 wherein the elastomer contains 2–25 carbon-to-carbon double bonds per 1000 carbon atoms.

13. The process of claim 12 wherein the bridged-ring hydrocarbon is 5-ethylidene-2-norbornene.

14. The process of claim 13 wherein the polymerization is carried out continuously in a reaction vessel, the resulting elastomer normally deposits on the internal surface of the reactor when the monomeric mixture is polymerized in the absence of the base, and the base is dissolved in the hydrocarbon solvent in an amount of about 1–30 moles per mole of heavy catalyst metal in the Ziegler catalyst to thereby suppress the deposition of the elastomer on the reactor surface.

15. The process of claim 14 wherein the monomeric mixture is polymerized in the presence of a catalyst prepared from vanadium oxytrichloride and an alkylaluminum sesquichloride, the alkyl group of the alkylaluminum sesquichloride contains 1–2 carbon atoms, the mole ratio of alkylaluminum sesquichloride to vanadium oxytrichloride is about 4–10, and the mole ratio of chemically bound ethylene to propylene is between 70:30 and 55:45.

16. The process of claim 15 wherein the base is ammonia.

17. The process of claim 15 wherein the base is aniline.

18. The process of claim 15 wherein the elastomer has an effective unsaturation level of about 10–60 carbon-to-carbon double bonds per 1000 carbon atoms.

References Cited

UNITED STATES PATENTS

| | | | |
|---|---|---|---|
| 3,219,648 | 11/1965 | Hill | 260—93.7 |
| 3,219,651 | 11/1965 | Hill | 260—94.9 |
| 3,269,996 | 8/1966 | Langer | 260—93.7 |
| 3,496,135 | 2/1970 | Caywood | 260—45.8 |
| 3,310,537 | 3/1967 | Natta | 260—79.5 |
| 3,383,371 | 5/1968 | Natta | 260—79.5 |
| 3,165,503 | 1/1965 | Kahn | 260—94.3 |

JAMES A. SEIDLECK, Primary Examiner

R. S. BENJAMIN, Assistant Examiner

U.S. Cl. X.R.

260—94.9